US006907549B2

(12) United States Patent
Davis et al.

(10) Patent No.: US 6,907,549 B2
(45) Date of Patent: Jun. 14, 2005

(54) ERROR DETECTION IN COMMUNICATION SYSTEMS

(75) Inventors: Nigel R Davis, London (GB); Graham Taylor, London (GB); Leilani Arambepola, London (GB)

(73) Assignee: Nortel Networks Limited, St. Laurent (CA)

( * ) Notice: Subject to any disclaimer, the term of this patent is extended or adjusted under 35 U.S.C. 154(b) by 500 days.

(21) Appl. No.: 10/109,949

(22) Filed: Mar. 29, 2002

(65) Prior Publication Data

US 2003/0188228 A1 Oct. 2, 2003

(51) Int. Cl.$^7$ ................................................ G06F 11/00
(52) U.S. Cl. ......................... 714/46; 714/57; 715/736
(58) Field of Search .............................. 714/43, 45, 46, 714/47, 57; 709/224, 248; 715/736, 734; 370/503

(56) References Cited

U.S. PATENT DOCUMENTS

| | | | |
|---|---|---|---|
| 5,504,921 A | * 4/1996 | Dev et al. | 709/223 |
| 5,848,243 A | * 12/1998 | Kulkarni et al. | 709/224 |
| 6,456,306 B1 | * 9/2002 | Chin et al. | 345/810 |
| 6,604,208 B1 | * 8/2003 | Gosselin et al. | 714/4 |
| 6,747,957 B1 | * 6/2004 | Pithawala et al. | 370/252 |
| 2002/0147809 A1 | * 10/2002 | Vinberg | 709/224 |
| 2003/0105856 A1 | * 6/2003 | Tse et al. | 709/224 |

OTHER PUBLICATIONS

Preside Service Fault Correlation 2.0.0. User Guide 450–3101–088 Aug. 2002 (65 pages).
Preside Service Fault Correlation 2.0 Operational Considerations Sep. 2001 (19 Pages).
Preside Service Fault Correlation 2.1 Operational Considerations Feb. 2002 (27 pages).
Preside Optical Applications Service Fault Correlation 2.1 User Guide Jan. 2002 (65 pages).

* cited by examiner

*Primary Examiner*—Scott Baderman
*Assistant Examiner*—Joshua Lohn
(74) *Attorney, Agent, or Firm*—Barnes & Thornburg

(57) ABSTRACT

A method for determining the impact on a network of a fault in the network, comprises the steps of constructing a layered topological model of the network according to a predetermined protocol, receiving an indication of an erroneous event at a point in the network, and modelling the impact on the network and its services resulting from the event by navigating the topological model. The modelling step includes applying a priority weighting to an erroneous event to determine a priority order in which a sequence of erroneous events may be attended to. The priority order may be based on cost-effectiveness of carrying out a particular repair. The method may alternatively be used to determine the location of a fault with increased certainty by relating an event with a previous erroneous event. The method is preferably implemented by a programmed computer.

15 Claims, 3 Drawing Sheets

ERROR DETECTION IN COMMUNICATION SYSTEMS

FIELD OF THE INVENTION

The present invention is concerned with methods, apparatus and systems for obtaining a more reliable indication of the likely location of a fault or error in a communication system. The invention can make a more reliable first estimate of such a location or can provide indication(s) that a first estimated location is more likely than another, i.e. corroboration of a first estimated location.

BACKGROUND TO THE INVENTION

There are a number of key focuses for operators of telecommunications networks. These include network construction, building services onto the network, and problem-finding during both the running and the constructional stages of the network. Implementation of the last of these key focuses relies on detectors for monitoring erroneous behaviour. It is often the case, however, that during normal network operation the network is in a variety of states. Some parts may be running service, some parts may be under repair, other parts may be under construction and other parts may be modified or adjusted and so on. Detectors have a habit of generating large streams of erroneous behaviour indicators during times when the network is in a state of flux. This can lead to clutter which can, in turn, blur real problem indications.

The task of finding faults in the network becomes strenuous because of the volume of static and transient indications masking potential serious real problem indications. One problem can give rise to a mass of error indications. For example, a break in a fibre carrying many signals may be indicated at the end of the fibre but components further away carrying aggregate signals or components of these signals may also indicate the fault and entities even further away do likewise. If a bundle of fibres are broken, for example by a digger, the network may give rise to thousands or even tens of thousands of error indications. These indications have a tendency almost to occur almost simultaneously, thereby swamping the system.

The network may also suffer small problems that can occur at the same time as the system is already swamped with the plethora of indications arising from a fault as previously mentioned. It can also be the case that a local fibre break can prevent problem indications being propagated with the result that distant problem indication indications are received first. This can make it almost impossible to locate the smaller local problems. It is of course possible that the smaller local problem may have more serious consequences to traffic and to the integrity of the network than the distant problems swamping the problem indication systems. Added to this, there are the possibilities that detectors themselves may be operating incorrectly and there may be intermittent faults in the problem indication system itself. A small fault may have intermittencies that can cause masses of changes in the problem indication. As a result of these difficulties, some networks use human operators literally sitting in front of monitors watching streams of error indications. Other systems employ a rule-based monitoring set up such that a break in one location triggers a series of reactions according to a set of rules so as to generate an error indication in a deterministic sense.

SUMMARY OF THE INVENTION

The basis of the present invention is therefore to take advantage of the deterministic nature of the network and to navigate the topology set up during construction of the network in order to recognise the relationship between detectors. Rule-based systems recognise these relationships but do not necessarily take advantage of the deterministic nature of the network. Taking advantage of the topological data inherent in a layered model of the network is therefore unusual.

In a first aspect, the invention provides a method for determining the impact on a network of a fault in the network, comprising the steps of: constructing a layered topological model of the network according to a predetermined protocol; receiving an indication of an erroneous event at a point in the network; and modelling the impact on the network and its services resulting from said event by navigating the topological model.

In a second aspect, the invention provides a method for locating a fault in a network, comprising the steps of: constructing a layered topological model of the network according to a predetermined protocol; receiving an indication of an inappropriate event at a point in the network; and modelling the impact on the network and its services resulting from said event by navigating the topological model, thereby to obtain a first indication of a possible fault location.

In a third aspect, the invention provides a network comprising means to locate a fault in the network, comprising: constructing means to construct a layered topological model of the network according to a predetermined protocol; a receiver adapted to receive an indication of an erroneous event at a point in the network; and navigating means to model the impact on the network resulting from said erroneous event by navigating the topological model, thereby to obtain a first indication of a possible fault location.

The modelling step may include applying a priority weighting to a said erroneous event whereby to determine a priority order in which to attend to a sequence of said erroneous events. The priority order is preferably based on the cost effectiveness of rectifying said erroneous events.

The indication of a possible fault location may be refined on the occurrence of a second erroneous event indication subsequent to said aforementioned erroneous event indication by associating the said erroneous event indications through relationships derived from the said model.

The navigating means and the constructing means may conveniently comprise a processor adapted to operate an appropriate algorithm.

The invention also encompasses a human or machine user interface enabling the method to be performed.

The invention further provides a computer program adapted to carry out the methods of the invention, and a data carrier carrying such a program.

The preferred features as described hereinabove or as described by any of the dependent claims filed herewith may be combined, as appropriate, as would be apparent to a skilled person, and may be combined with any of the aspects of the invention as described hereinabove or as described by any of the independent claims filed herewith.

BRIEF DESCRIPTION OF THE DRAWINGS

The invention will be described with reference to the following drawings, in which.

DETAILED DESCRIPTION OF THE ILLUSTRATED EMBODIMENTS

Figure 1:
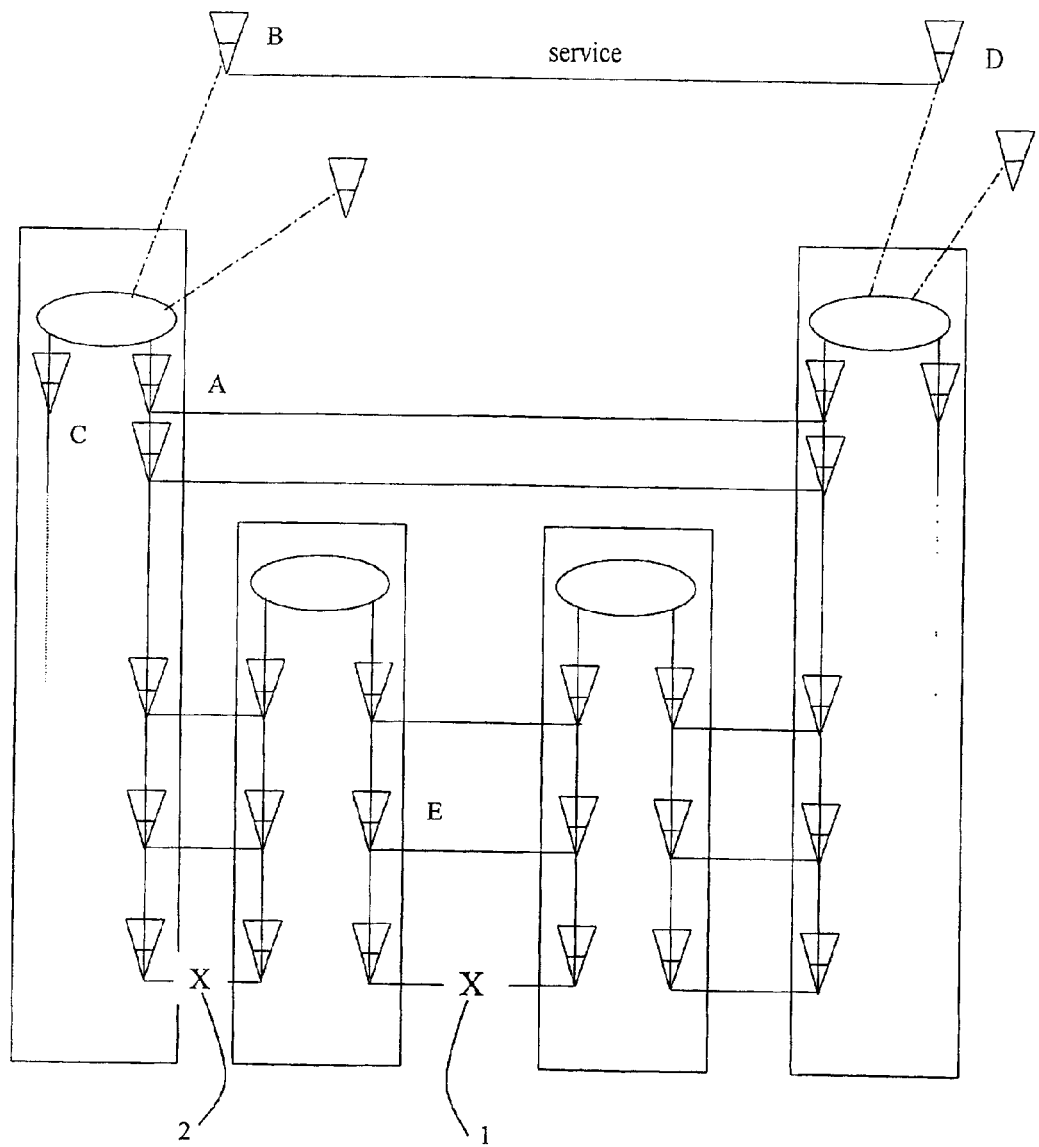
FIG. 1 is a generalised view of part of a network layered in accordance with a G805 Standard topological model.

Consider the situation where there is a physical fibre break in a telecommunication network. There could be many thousands of telephone conversations taking place over that particular fibre. The invention relies on the creation of a topological model that represents the equipment and traffic flow within the network. The best known model in current technologies is the G805 Standard layer model, as represented in FIG. 1. The layered topological model may be built in a variety of ways that do not affect the scope of the present invention. However, for the sake of completeness, it may be mentioned here that the model can be created by manual data entry or by any other technique that builds up layer by layer from information concerning the layers closest to the physical layer.

The algorithmic approach used in the present invention relies heavily on the topological layered model and the relationship between the layers. In the case of the notional physical fibre break, there are no means available to detect the breakage directly. The detectors themselves are probably located at the layer closest to the physical layer. All of the clients being served by the layer in which the fault occurs will therefore be affected by the fault. In the example where there are possibly 10,000 phone calls being carried, there may be a loss of 20,000 conversations arising from that one fault. The topological model models the network in terms of signal flow. From a particular detected fault at a given point in time, for example a telephone no longer working, the model uses the layer model hierarchy to find out the most likely cause. This could be called the most significant detected condition. Current systems do not take account of the detected condition in the same way as the present invention. For example, catastrophic failure of a line, perhaps by being dug up by a mechanical digger, presents itself as a line signal failure whereas, in reality, line failure is not a probable cause but a symptom.

Recapping, one fault could have caused 20,000 problem indications to have gone off in the network. It is not helpful for a human operator to have to watch 20,000 problem indications to find out which is the root detected condition, typically the cause closest to the location of the fault, before initiating a call-out. One of the key advantages of the present approach is that the new system can be used to filter out the noise and to focus in on the most significant fault.

The seriousness of the problem is largely influenced by the amount of traffic being carried. For example, a 40 Gbps line carrying no traffic is of little consequence compared to say a 64 Kbps line carrying a single conversation of national importance. The crucial factor is what is happening to the path where the fault occurs. Prioritisation of service can be taken into account in the present system in order to decide which is the most important fault to rectify first. The probable reason for the fault and the consequential cost can also be taken into account by the invention. A weighting can be applied to determine which is the most cost effective repair to undertake first. It may make more economic sense to repair the cheaper fault first in order to derive revenue than to repair an expensive fault that may actually be more catastrophic. The topology can be used to characterise the links in any particular way, such as on the basis of customer names, priority, importance to the network provider and revenue. The preferred implementation of the invention allows work to be prioritised.

Re-routing around a fault may take advantage of prioritisation information to implement the re-routing according to a desired outcome. The characterisation information can be related to the topological organisation in terms of a life cycle including for example installation, maintenance and so on. The layered model represents the bottom-most layer as in for example the G805 system. In the illustrated example the first three layers contain nothing of any significance. For example, there are no couplers and the like. In other layers there may be cross connects and/or there may be optical or electrical links. When this hierarchy recurses to the uppermost levels there can be N services between distant locations and there may be traffic in both directions.

Consider receiving a fault indication at the edge first. It could be appropriate then to look into the network to investigate the occurrence to see what the cause of the problem is and where the fault indication came from. To approach the problem from the top downwards is particularly inefficient. This process will involve investigating the same links time and time again and invariably finding no problem each time. It is far more efficient to wait to be told what the fault is or what the cause was. Eventually such an indication will be received. An extension of this, particularly where no detectors are present, is to use the topology model to determine lower/server layer links at which tests can be carried out to determine the probable root error/fault condition. Everything above the fault condition indication must have been caused by the original fault. It is pointless then to investigate in a downward direction. Where a second fault is indicated after a first, it may be necessary to clear one before the other can be located. The present system avoids that uncertainty by waiting until the fault indications have been received and navigating upwards. The topology model itself can then be comparatively simple. The system looks for accumulation of fault indications. The service at the top of the network may go through 10s or 100s of physical 'hops'. It is therefore grossly inefficient to look down through all of those hops. It is far more efficient instead to wait for an indication from one of those hops.

Another key feature of a preferred form of the invention is to store or log the various fault indications so as to assist, where a number of fault indications have been received, in building up the logical sequence enabling the fault to be located. This prevents the same calculations being performed repeatedly. The invention can provide a superior service to customers in that they can be contacted about a fault before they realise themselves that there is a fault. Armed with the knowledge that there is a problem, the next logical step is to attempt to find the cause of the problem. It is necessary to have an accuracy indication, for example where communication has been lost, how long the problem has existed and how long ago it may have been rectified. Where a fault indication has existed higher up in the topological hierarchy for a period of time, for example one hour, that is more likely to indicate a true underlying fault than an indication of far shorter duration, for example one second, in a lower layer. Detector attributes can be given and utilised to provide an understanding of the fault indication rather than just using the existence of a fault indication. It adds to the intelligence of the system.

Other systems that relate problem indications to network topology do not take the layers into account. A link will be regarded as having a problem indication if both ends have problem indications, but it will not be able to indicate a probable root detected condition. If some of the services are not terminated within the system's view or some of the equipment does not have detectors, as long as the topology model has a model of the relevant services it is still possible to determine the error. The detectors may be outside the area of control or view of the network provider, so access to detectors as a way of supervising the network is not always feasible. Different operators do not necessarily share information about fault accumulation in their own part of a network.

Referring to FIG. 1, a failure at 1 in an unprotected network causes a failure elsewhere. The topological model represents the link and the connectivity (the link may contain items of equipment represented in the model). In the case where a path has two possible exits controlled by a protection switch and one path has failed but the other has not, the switch may have been the last item to fail. This information can be brought into the system as part of the historical failure information about the network in order to enhance the reliability of the probable root detected condition indication generated by the system. In addition, where fault indications are found beyond the protection switch, one path is operating and the other has failed but there is an overall failure, it indicates that there are two failures, one of which has been shown up by the other. Perhaps the protection switch has failed or has locked up or there has been a subsequent failure downstream. First, the topology allows the system to recognise that there are two problems and that there is a relationship between them. Second, the system can make an initial diagnosis as to why the problem, has occurred. The system can utilise information as to the status of a protection switch (for example) but, equally, it can manage without and can still produce a first diagnosis.

The layered topology model allows the network operator to evaluate the impact on the network resulting from making a change to the network. For example, a problem indication at a particular location would cause the model to evaluate or perhaps predict the impact on the rest of the network. The topology may change validly as a result of network growth, for example. A typical topology change would be by a change to the service provided by the network without necessarily involving additional equipment. The insertion of a network device, however, would change the topology quite radically. The mere fact that existing connections would have to be cut in order to insert a device would generate problem indications, so the system would recognise from life cycle data that that particular part of the network was undergoing a build and would therefore interpret problem indications accordingly, for example by interpreting them as merely status indications of the progress in the network change.

The physical topology of the network can therefore be reflected in the layer model. Put another way, the system relates the topology to the physical equipment. The same can be done for network synchronisation. Here, it is normal in SDH 64 Kbps systems for example, to propagate a timing or synchronisation signal around the network. It is often the case that this signal has the same interconnectivity as the traffic and is prone to failure at the same time as the traffic itself. It invariably has its own protection scheme, which is arranged to switch to alternative sources in the event of a failure. Of course, these sources can themselves fail. The synchronisation network can be modelled as a traffic topology in its own right, using the same techniques and layering as for traffic. The invention can therefore be applied to these synchronisation networks in the same way as for traffic per se. The impact on the remainder of the network from a failure in the synchronisation network can therefore be predicted by the invention.

Referring to FIG. 1 again, the reliability that can be attached to a fault indication can be said to depend on how far into the layer model the navigation has reached. Navigation may only reach point A, say. However, if it leads beyond A to a point E, say, which is the furthest that can be reached downwards into the hierarchy, there is a strong likelihood that E is logically closest to the fault location. If A is the lowest point in the hierarchy that can be reached, only the passage of time will determine whether A is the likely fault location rather than the fault actually being further down the hierarchy. Although the impact of the original fault indication can be given virtually immediately by the present invention, an indication of the location of the fault depends on confirmation through the passage of time. Where the point E, say, is at the extremity of the vendor's network and continuation of the network is within the province of another vendor, i.e. the network is a multi-vendor network, the exact fault location can only then be discovered by investigating the next adjacent vendor's topology model, if one exists.

In general terms, as information is generated as to the impacts on the network from a fault indication, information can also be accumulated about the relevance of fixing the fault, based on the cost of the impact. For example, a fault indication at point E that is affecting half the vendor's business needs fixing sooner than later, whereas a similar fault indication at the same level at another location but relating to a part of the network carrying no traffic can wait. Characteristics relevant to cost can therefore be built into the algorithm so that the operator can be informed as to the impact of a fault indication in commercial terms. For example, characteristics may be applied in respect of the volume of traffic that a particular customer pays for as compared to another customer. The impact of the fault indication can be presented in terms of future business from one customer so as to provide information to the operator which the operator is free to use in order to steer the decision as to the priority to be allocated to repairing faults. This type of information is but one of a number of factors that the algorithm can operate upon in its service impact generation.

The topology model will include such detail as the card connected to termination points in the network so that the impact of pulling out or changing a card can be worked through by the algorithm. The topological model can be extended to less deterministic spaces than have been described so far. For example, in the case of sections of networks provided with protection, the states of protection switches and the switched routes through those switches would not normally be tracked. The important thing is that the network topology can be derived from the network.

As well as providing a first indication of a possible fault location the invention also provides a technique that improves the confidence with which the network operator can decide where the most likely fault location lies. Consider the following scenarios:

(i) A "problem" indication has already been received at A in, for example, a server layer. Subsequently, a problem indication is received at B in, for example, a client layer. On the basis of A, it has been decided that the signal conveyed at B is faulty, i.e. B has been impacted as a result of receiving the indication on A that A was impacted. The presence of B is therefore a re-affirmation if the indication was relevant to B. A lower error rate at A and a failure at B are therefore an indicator that the problem lies more with B;

(ii) An indication is first received from B. A subsequent indication from A can then improve the accuracy or understanding of the nature of the fault and its location;

(iii) An indication is first received at A and there is an impact on a number of services B1, B2, B3 and so on. If B1 is first out of the Bs, the indication on A can lead to an indication that A is actually the cause of the indications on B2, B3 etc;

(iv) Indications from B and C separately can be explained by a later indication from A.

In the case of bi-directional traffic flow in parts of the network, an indication from B can be interpreted in the sense that there has been a service failure, for example, in one traffic direction. A subsequent indication from D means that there has been a failure in the opposite traffic direction. This situation will arise when A and D are in the same topological layer.

The next part of the present description sets out the essential steps of the preferred form of the algorithm but first, it is useful to outline the data model held by the system. This includes the following entities:

Trail

Termination point (TP)

Supporter group

Supporter component

Problem Indication

Figure 2:
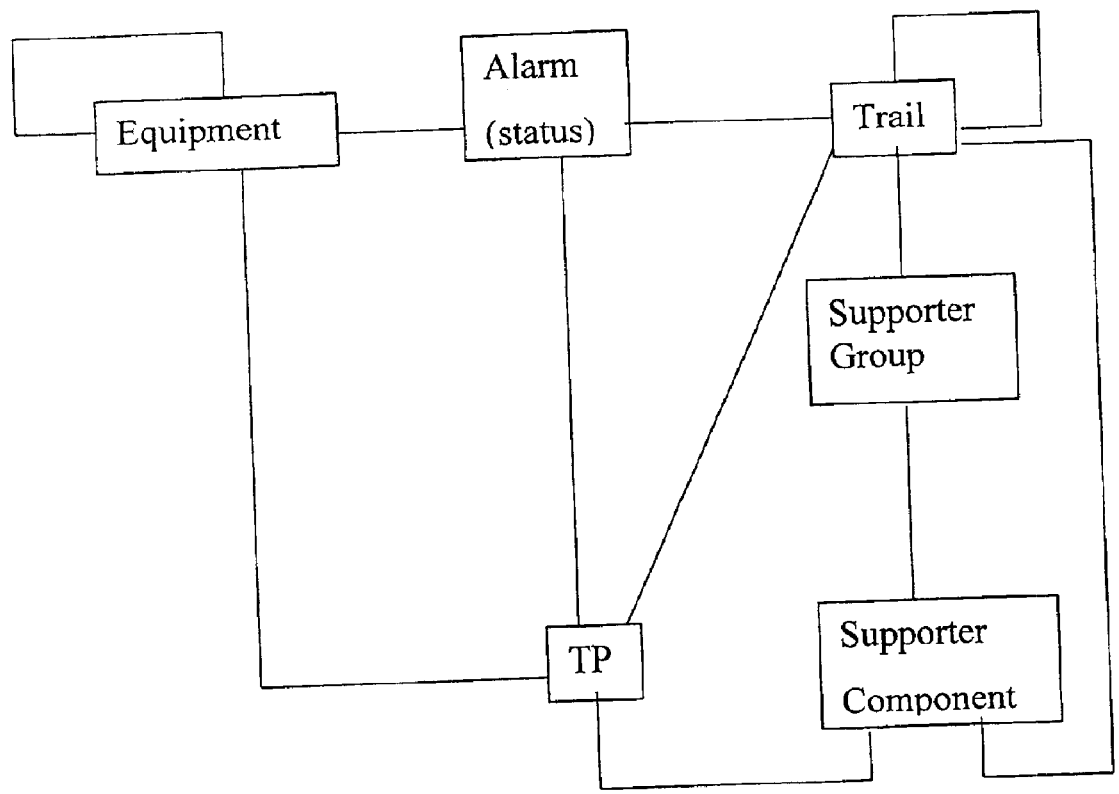
FIG. 2 illustrates the main relationships between the entities of an event correlation system in accordance with the invention.
Figure 3:
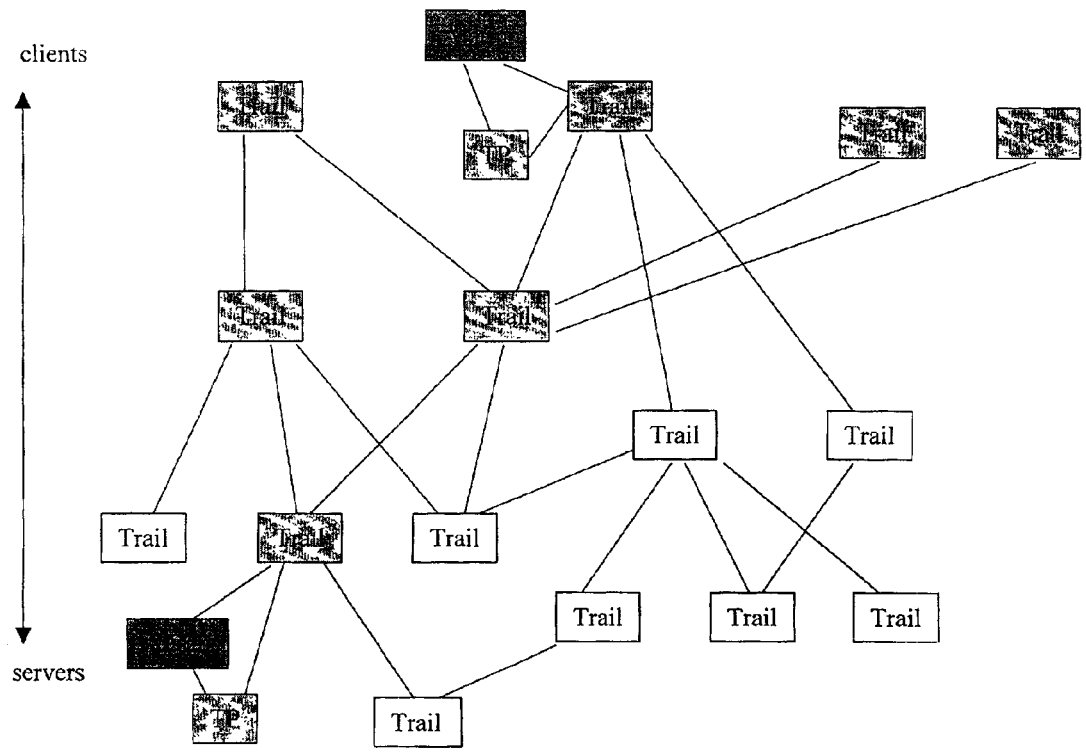
FIG. 3 illustrates the entities that represent an example of a network with no protection and no equipment problem indications.

All the entities, apart from 'Problem Indication', have a state. This can take various values, including OK, impacted or degraded. 'Problem Indication' has a Boolean 'root cause' status. The main relationships between these entities are shown in FIG. 2.

The data model uses a representation of Trail/Network topology that is tailored to the Topology/Event correlation function, supporting an efficient algorithm for maintaining synchronisation of model to network and for responding to user queries. It is based on the following concepts:

Each trail has a number of supporters. These may be TPs, Server Trails or supporter groups. If any supporter of a trail is impacted, the trail is impacted. The supporter group is used to describe groups of supporting objects, all of which need to be impacted before the trail is impacted. The supporter group contains supporter components. All supporter components need to be impacted before the group is impacted. The supporter components are used, for example, to describe alternative protection paths.

The supporter group and supporter components may themselves contain supporter groups, allowing arbitrary nesting of protection.

The preferred form of the algorithm will now be described in the context of an event comprising a New Problem indication Raised.

STEP A: Find entity directly impacted by problem indication:

The problem indication can be raised against various network entities as indicated by the problem indication message. The following are considered here:

Problem indication raised against an equipment entity, e.g. NE, card: use relationships between equipments in model to determine all ports that are contained in the impacted NE/card and hence which physical 'termination points' are impacted.

Problem Indication Raised Against a Termination Point

For cases 1 & 2, mark the termination point as impacted if necessary. Note that the problem indication meaning can be used to decide whether this problem indication would cause a TP state change (e.g. a warning 'problem indication' may not).

Problem indication raised directly against a lowest layer trail object trail maybe modelled in a separate system such as 'GIS' (Geographical Information System). Consider problem indication meaning and change Trail state to impacted if necessary.

In all cases, create an association between the problem indication and impacted TP or Trail. Carry out step B.

STEP B: Find all trails impacted by problem indication. This is done by propagating the state change in step A to all dependent entities.

Change state of all TPs' direct dependents to impacted. If these are trails, associate problem indication with each trail*.

For each supporter (e.g. trail or supporter component/group) that has changed state, update state of direct dependents as necessary If a Supporter Component has changed state, check all components in supporter group and update dependent supporter group state as necessary**

Repeat from step 2 until there is no state change and/or there are no more dependents.

This results in all trails which are clients of the impacted trail being marked as impacted where appropriate (e.g. unless they are protected trails).

(* Trail-problem indication association id done to improve efficiency.

**Optionally, entires which have related impacted entities but are not impacted themselves (e.g. because of protection) may be put into state 'degraded'.)

STEP C: Determine if problem indication is a root cause problem indication

If none of the directly impacted trails, as identified in step B1, were previously impacted, the problem indication is marked as a root cause problem indication.

This part of step C considers only the trail identified in step 1 which is actually present in the network, not planned trails. If this trail WAS previously marked as impacted, then the following check is made:

Check the trails servers. If any are in state impacted, problem indication is not root cause.

If there are impacted servers, all problem indications must be in the trail's own layer. Hence mark this problem indication as root cause*.

(* Could optionally carry out checks based on problem indication meaning here, e.g. RDI is not a root cause problem indication, but this requires corresponding checks during problem indication clear)

The algorithm is now described in connection with an event—Problem indication Cleared:

Check if problem indication has already been correlated to a trail, by checking if it is associated with a trail. If not, there is nothing to do. Otherwise:

If not a root cause problem indication, delete problem indication. No further processing required.

If problem indication is root cause:

Check if trail has any other problem indications. If so, just delete cleared problem indication. No other processing required.

If trail has other no problem indications, update TP state and trail state. Propagate this state change to all dependent entities as described in STEP D below.

STEP D: For each supporter (e.g. trail or supporter component/group) that has changed state, update state of direct dependents as necessary. Note that an entity will not change state to unimpacted if some of its other supporters are impacted (e.g. has another TP with a problem indication).

For each entity which is still impacted, check whether it has direct problem indications and, if so, whether the problem indication should change its status to root cause as a result of the new problem indication clear.

If a Supporter Component has changed state, check all components in supporter group and update dependent supporter group state as necessary.

Repeat from step 1 until there is no state change and/or there are no more dependents.

This results in all trails which are clients of the impacted trail having state changed to unimpacted where appropriate.

The algorithm will now be described in connection with an event—Trail Added/Deleted.

Trail added (trail can have only servers, no clients):

Check trail's servers. If any server trails have state impacted, new trail has state impacted.

Determine all TPs belonging to new trail. For each TP, check if there are any problem indications raised against this TP.

For each problem indication in set of problem indications raised on trail's TPs, carry out 'new problem indication raised' for the new trail.

Trail deleted (trail can have only servers, no clients):

1. Delete trail. If any problem indications directly impact this trail and are root cause, delete or update associated problems.

User queries including the following can be simply responded to with the proposed model and algorithm:

Trail impacted/operational state: Identify each trail and check its current state (hence can find all impacted trails)

Find root cause problem indications for Trails: For each trail: navigate down server trail hierarchy, adding root problem indications from each server trail, to compile a list of all root problem indications.

Problem indication root cause status: identify problem indication and check status (hence can find all root cause problem indications)

Find trails/services impacted by problem indications: For each problem indication, find impacted trail and navigate up the client/server tree to create list of impacted trails.

Find all root cause problem indications and all trails/services they impact: Find all root cause problem indications as in (c) and then find trails for each problem indication as in (d). Leaf trails are services.

NB Optionally, extra relationships may be added to the model (e.g. root cause problem indication to services) to improve efficiency of response to user queries.

In addition to trail addition and deletion, the network topology may change because a route of a trail is modified, e.g. to avoid a problem. This may result in the trail no longer being impacted by a given detected condition. Similarly, the trail's clients' state may change (e.g. from impacted to unimpacted). The method described is able to correctly deal with such a case in a way similar to the above.

What we claim is:

1. A method for determining the impact on a network of a fault on the network, the network comprising a traffic network and a synchronisation network, the method comprising the steps of:
constructing, according to a predetermined protocol, a layered topological model of the traffic network and a layered topological model of the synchronisation network;
receiving an indication of an inappropriate event at a point in the network; and
modelling the impact on the network and its services resulting from said event by navigating the topological model of the traffic network and the topological model of the synchronisation network.

2. A method as claimed in claim 1, wherein the modelling step includes applying a priority weighting to a said inappropriate event whereby to determine a priority order in which to attend to a sequence of said inappropriate events.

3. A method for locating a fault in a network comprising a traffic network and a synchronisation network, the method comprising the steps of:
constructing, according to a predetermined protocol, a layered topological model of the traffic network and a layered topological model of the synchronisation network;
receiving an indication of an inappropriate event at a point in the network; and
modelling the impact on the network and its services resulting from said event by navigating the topological model of the traffic network and the topological model of the synchronisation network, thereby to obtain a first indication of a possible fault location.

4. A method as claimed in claim 3, wherein the modelling step includes applying a priority weighting to a said inappropriate event whereby to determine a priority order in which to attend to a sequence of said inappropriate events.

5. A method as claimed in claim 4, wherein the priority order is based on the cost effectiveness of rectifying said inappropriate events.

6. A method as claimed in claim 3, comprising the further step of refining the indication of a possible fault location on the occurrence of a second inappropriate event indication subsequent to said aforementioned inappropriate event indication by associating the said inappropriate event indications through relationships derived from the said model.

7. A network comprising a traffic network and a synchronisation network, the network comprising means to locate a fault in the network, comprising:
constructing means to construct, according to a predetermined protocol, a layered topological model of the traffic network and a layered topological model of the synchronisation network;
a receiver adapted to receive an indication of an inappropriate event at a point in the network; and
navigating means to model the impact on the network resulting from said inappropriate event by navigating the topological model of the traffic network and the topological model of the synchronisation network, thereby to obtain a first indication of a possible fault location.

8. A network as claimed in claim 7, wherein the navigating means comprises a processor adapted to operate an algorithm to navigate the topological models.

9. A network as claimed in claim 7, wherein the constructing means comprises a processor adapted to operate an algorithm to construct the topological models.

10. A human user interface enabling a method as claimed in claim 1 to be performed.

11. A machine user interface enabling a method as claimed in claim 1 to be performed.

12. A computer program stored on a computer executable storage medium, the computer program adapted to perform a method for determining the impact on a network of a fault on the network, the network comprising a traffic network and a synchronisation network, the method comprising the steps of:

constructing, according to a predetermined protocol, a layered topological model of the traffic network and a layered topological model of the synchronisation network;

receiving an indication of an inappropriate event at a point in the network; and modelling the impact on the network end its services resulting from said event by navigating the topological model of the traffic network and the topological model of the synchronisation network.

13. A computer program stored on a computer executable storage medium, the computer program adapted to perform a method for locating a fault in a network, the network comprising a traffic network and a synchronisation network, the method comprising the steps of:

constructing, according to a predetermined protocol, a layered topological model of the traffic network and a layered topological model of the synchronisation network;

receiving an indication of an inappropriate event at a point in the network; and modelling the impact on the network and its services resulting from said event by navigating the topological model of the traffic network and topological model of the synchronisation network thereby to obtain a first indication of a possible fault location.

14. A computer executable storage medium on which is stored a program adapted to perform the method according to claim 12.

15. A computer executable storage medium on which is stored a program adapted to perform the method according to claim 13.

* * * * *